United States Patent [19]
Schmermund

[11] 4,031,445
[45] June 21, 1977

[54] CONTROL ARRANGEMENT FOR A CAM PRODUCTION MACHINE

[76] Inventor: Alfred Schmermund, 62, Kornerstrasse, 5820 Gevelsberg, Germany

[22] Filed: Aug. 21, 1975

[21] Appl. No.: 606,827

[30] Foreign Application Priority Data

Aug. 26, 1974 Germany .......................... 2440775

[52] U.S. Cl. ............................... 318/568; 318/570; 318/573; 235/151.11
[51] Int. Cl.² .......................................... G05B 19/42
[58] Field of Search .......... 318/568, 573, 570, 572; 235/151.11

[56] References Cited

UNITED STATES PATENTS

| | | | |
|---|---|---|---|
| 3,727,119 | 4/1973 | Stanley | 318/568 |
| 3,875,382 | 4/1975 | Cutler | 318/575 |
| R28,766 | 4/1976 | Villano | 318/573 X |

Primary Examiner—B. Dobeck
Attorney, Agent, or Firm—Sughrue, Rothwell, Mion, Zinn & Macpeak

[57] ABSTRACT

An automatic milling or grinding machine provided with a rotationally and rectilinearly displaceable workpiece support is disclosed. Sets of information relating to the law of a camming surface to be formed on a workpiece and to workpiece-dependent parameters determining dimensional characteristics of the camming surface, respectively, are stored in the machine. Related items of information derived from each set are operatively associated with one another and a succession of angle information signals are generated, the succession defining a circular arc corresponding to one on which the axis of rotation of a given roller follower would move on following the camming surface. The machine provides pairs of co-ordinate displacement command signals in response to each angle information signal and applies the command signals to orthogonal co-ordinate drive means arranged to displace the workpiece support along the circular arc in a plane perpendicular to the rotational axis of the workpiece support.

7 Claims, 3 Drawing Figures

CONTROL ARRANGEMENT FOR A CAM PRODUCTION MACHINE

BACKGROUND OF THE INVENTION

The present invention relates to a control arrangement for a cam production machine, for example, a cam milling machine or cam grinding machine for the production of axial curves — so-called cup or drum cams — and radial cams or disc cams for oscillating driven levers.

A universally usable cam production machine should be capable of producing cams with as many rising or falling flanks as required in any desired sequence and with any desired swivel angles, associated with the cam flanks of the oscillating layers, and indeed according to a multiplicity of selectable cam laws. In particular, it should also be capable of producing pairs of cam flanks associated to one another for the forced guidance of follower levers, which requires particularly great accuracy. It is desirable to be able to select readily the particular dimensions of a workpiece corresponding to a particular law of the cam profile to be milled, although the law determining data remains fixedly stored in storage means of the machine.

Initially reference will be made to FIGS. 1 and 2 in order to clarify certain terms and relationships, which are well known to those skilled in the automatic machine tool art, and in order to highlight a number of technical problems the understanding of which is a necessary precursor to the understanding of the invention. Referring first to FIG. 1, which shows a cam body which is mounted to be rotatable about a centre of rotation 2. The direction of rotation is indicated by the arrow 3. 4 is the cam profile, which does not necessarily lie on the outer circumference of the cam, but may also be disposed on an internal surface of the cam body. The falling flank 5 and the rising flank 6 are sensed by a roller follower 7, the axis of rotation 8 of which is the centre point of the roller bearing, which is provided on a lever follower 9. The lever 9 is pivotably supported at 10. The points 8 and 10 are connected with one another by the centre line of the lever 9. The centre line of the lever 9 is positioned as indicated at 11 before the roller 7 transverses the falling flank 5 and is positioned at 12 after the roller 7 has traversed the falling flank 5. During such a motion of the lever 9, the axis 8 of the roller 7 passes along an arcuate path 13 and the same path is of course passed through in reversed sequence when a rising flank portion of the cam is traversed by the roller. The reference numeral 14 indicates the angle through the lever 9 is pivotally displaced during the traverse of the path 13. 15 designates the flank angle, i.e. the angular extent of a falling or rising flank. The extreme positions of the axis 8 are connected with one another in FIG. 1 by a straight line 16. The radius of any one point on a flank of the cam body 1 is designated by 17. Explained with reference to FIG. 2 is a special form, in which the take-off does not ensue by means of an oscillating lever, but by means of a linearly guided push rod. The push rod executes a stroke 18 during the traverse of a flank, wherein the centre point of the driven roller runs through a linear path 19.

As is known, one lets falling flanks or rising flanks in control cams take such a course that the spacing between centre of rotation of the cam body and the axis of a roller follower progresses in dependence upon flank angle corresponding to a certain law. There is frequently concerned a connection according to a law representable by a formula, for example that the increase of the stroke of the roller follower over the flank angle take place in accordance with a sine function. This connection of displacement magnitude of a driven member and associated angular extent of a cam is referred to as the law of the cam. For such a cam law, one can produce tables for normalized dimensions, which then contain the co-ordinate pairs for a certain number of so-called support points of the path of motion of the centre point of the driven roller.

There are different possibilities of associating a desired cam law with a certain displacement magnitude, for example stroke height or swivel angle, of the cam gear. FIG. 2 is to be considered once again in this context. It is to be assumed, that the cam law has been considered in the production of the cam in such a manner, that the increase of the cam radius 21 is a function of the increase of the flank angle 20 according to the chosen cam law. The displacement of the push rod follower, which is dependent upon the rotation through the flank angle 20, will then not exactly obey the chosen cam law. The displacement of the push rod will correspond exactly to the chosen cam law only when the cam has been produced by a tool the diameter of which was identical with the diameter of the driven roller, and which was guided according to the cam law on the same linear path, which is later to be traversed by the centre point of the roller follower. Otherwise, distortions result. Similar remarks apply to the arrangement shown in FIG. 1 It is desired, that the swivel angle 14 of the lever follower 9 obeys the desired cam law in dependence upon the flank angle 15. The arc 13, which is traversed by the axis 8 or the centre point of the driven roller 7, corresponds to the swivel angle 14. In a known approximate solution, the cam law is transferred to the notional rectilinear connection 16 of the end positions of the centre point of the driven roller. In this case, the swivel angle 14 obeys a "distorted" cam law. This distortion is very frequently so small, that it is tolerable in practice. In some applications, however, such distortion is unacceptable, for example when cams associated with one another must be produced to generate shape-locked motion. These cams operate without jamming and knocking only when the respective partial angle of the swivel angle 14 or the respective partial arc of the circular arc piece 13 increases exactly according to the desired cam law.

As is known, there are numerically controlled milling machines, which can also be equipped with grinding devices, in which control data can be input to the machine by perforated or magnetic tapes, according to which the individual displacements of the tool carrying and workpiece carrying carriages in co-ordinate pairs can be predetermined. This means, that the co-ordinates actually to be predetermined for the production for a special cam must be calculated support point by support point from tables, which contain normalized co-ordinate pairs for certain cam laws, or with the use of appropriate mathematical formulae. Thereafter, the co-ordinates are stored and afterwards again read out during the production. It is clear, that the entire calculation is to be repeated for cams, which differ from one another in size even though they have the same cam law. The co-ordinates of course arise in such quantities, that the calculation is practically able to be carried out only by a digital calculator. As a result, it takes very long before a cam can actually be produced and one can also not interrupt the work and only undertake slight corrections without the entire calculation having to be repeated. This is a most undesired consequence particularly in the trial stage.

For the determining magnitudes of the cams being given in or modified with little effort even at the cam production machine itself, the control arrangement must have the following properties:

Firstly, the data of the selectable cam laws must be present already stored, i.e. the cam laws must be re-callable. The data of the cam laws will be designated in the following discussion as workpiece-independent data. Secondly, possibilities of input, also for the onput by hand, of data corresponding to the respective workpiece specially to the produced must be present; these data will be designated in the following discussion as workpiece-dependent magnitudes. Thirdly, the control arrangement must finally be able to interlink the stored workpiece-independent data (given from the cam law) with the workpiece-dependent data into control data for individually determinable cams.

In one known cam production machine, the cam laws can be stored in storage means. The cam law can be present as a template or in the form of digitally stored co-ordinate data. The workpiece-dependent determining magnitudes of the cam such as individual cam stroke and individual flank angle, can be predetermined by input means specially provided therefor. A great production flexibility can thus be attained by manual input of data directly into the control arrangement.

With such known cam production machine and its control arrangement, it is however possible only to realize the cam law on the straight line 16 according to FIG. 1, i.e. for an oscillating lever follower of infinite length. In most cases, this inaccuracy does not matter, but there are cases, where one is in fact forced to realize the cam law exactly along the circular arc line 13 according to FIG. 1. It has already been remarked above that this is the case for shape-locked motions such as occur between mutually interacting gears of a gear train.

SUMMARY OF THE INVENTION

According to the present invention there is provided an automatic milling or grinding machine comprising a tool support, a rotationally and rectilinearly displaceable workpiece support, first storage means to store information relating to the law of a camming surface to be formed on a workpiece by a tool when mounted by the tool support, second storage means to store information relating to workpiece - dependent parameters for determining dimensional characteristics of the camming surface, co-ordinator means to operatively associate with one another related items of information derived from each of the first and second storage means thereby to generate a succession of angle information signals, the succession defining a circular arc corresponding to one on which the axis of rotation of a roller follower of given dimensions would move on following the camming surface, and command signal generator means responsive to the angle information signals to apply pairs of co-ordinate displacement command signals to orthogonal co-ordinate drive means arranged to displace the workpiece support along said circular arc in a plane perpendicular to the rotational axis of the workpiece support.

The storage device for the cam laws may store a representation of these laws either in numerical form, i.e. in the form of normalized co-ordinate pairs, or in the form of the mathematical law, according to which a calculation for each individual cam is carried out during the processing.

The data may be re-called from the stores under control by a timing transmitter, which also checks the feed to the drive devices of the control signals present after the interlinking. The timing transmitter is expediently driven synchronously by one of the drive devices, preferably by a drive motor associated with the workpiece spindle.

BRIEF DESCRIPTION OF THE DRAWINGS

An embodiment of the present invention will now be more particularly described by way of example to the accompanying drawings, in which.

DESCRIPTION OF THE PREFERRED EMBODIMENT

Figure 1:
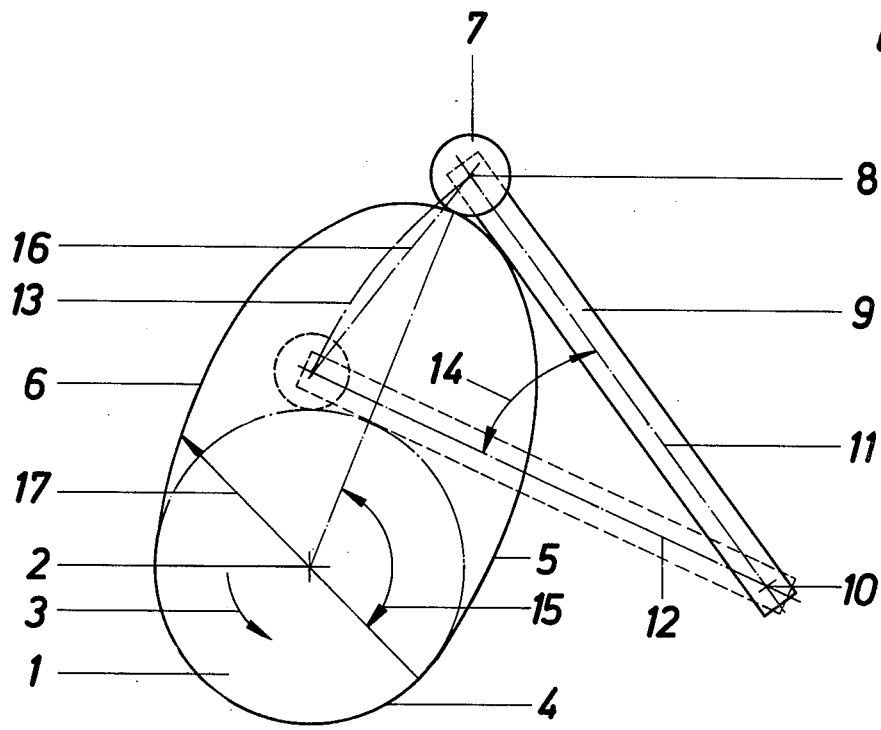
FIG. 1 illustrates schematically certain relationships between a cam and a cam follower and has already been referred to in order to clarify some of the technical terms of the art.
Figure 2:
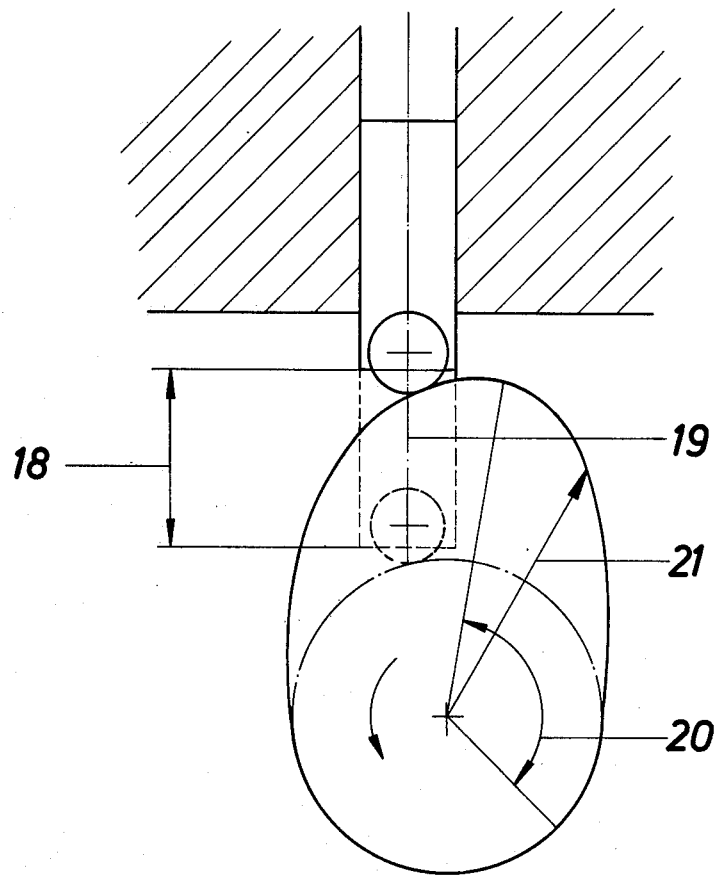
FIG. 2 illustrates schematically certain relationships between a cam and a cam follower and has already been referred to in order to clarify some of the technical terms of the art.
Figure 3:
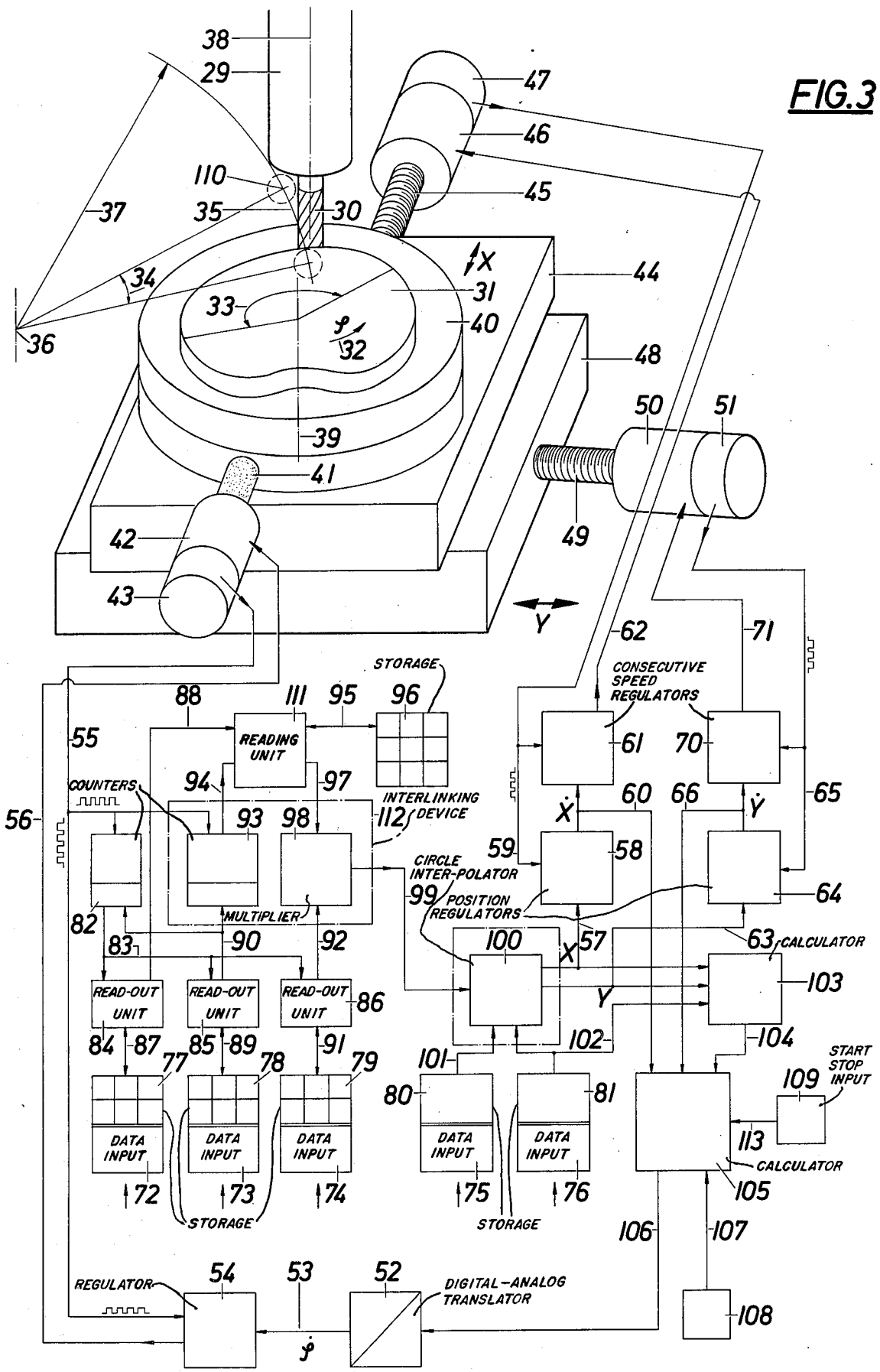
FIG. 3 shows block schematically the main elements of a milling or grinding machine for producing cams and embodying the present invention.

FIG. 3 of the accompanying drawings shows an automatic milling or grinding machine provided with a rotatable milling or grinding tool for producing camming surfaces on a rotatably supported workpiece. In the embodiment shown in FIG. 3 the axis of rotation of the tool and the workpiece extend parallel to one another and the workpiece support means is additionally rectilinearly displaceable in each of two mutually perpendicular co-ordinate directions in a plane perpendicular to the axis of rotation of the workpiece. The machine shown in FIG. 3 also comprises control means for controlling the relative displacement of the tool and the workpiece in order to mill or grind a predetermined camming surface on the workpiece so as to produce a cam having prescribed characteristics. In FIG. 3, the control means is represented by a block-schematic diagram, components of which are connected as shown to rotational and rectilinear drive means of the machine.

Tool support means in the form of a tool spindle 29, rotatable about a central axis 38, concentrically carries a tool 30, by the outer circular circumference of which the cam profile of a cam body 31 is generated. The cam body 31 is clamped on a turn-table 40 of a workpiece spindle ($\phi$-axis) rotatable about the central axis 39. The workpiece spindle is rotated in direction of the arrow 32 controllably in respect of rotational speed around the central axis 39 through the shaft 41 by means of the regulable electrical drive motor 42, which is supplied through the connection 56. Connected with the drive motor is a rotationally incremental rotation transmitter 43 as timing pulse generator, which through a connection 55 delivers pulses, the number (for example 1000 pulses per revolution) of which is a measure of the angle of rotation traversed by the drive motor 42.

A speed change (for example 1 : 3.600) is undertaken in a not shown gearing, disposed underneath the turntable 40, for the rotary motion of the motor transmitted through the shaft 41.

The turntable 40 is supported on a carriage 44 (X-axis) longitudinally displaceable perpendicularly to the central axis of the tool spindle. The motion of the carriage 44 is generated through a rolling ball spindle 45 by a controllable electrical drive motor 46, which is controlled through the connection 62. Connected with the drive motor 46 is a rotationally incremental rotation transmitter 47, which through a connection 59 delivers pulses, the number of which is a measure of the angle of rotation traversed by the drive motor 46. The carriage 44 in its turn is supported on a further carriage 48, which is longitudinally displaceable in a direction disposed perpendicularly to the central axis 38 of the tool spindle as well as also perpendicularly to the direction of motion of the carriage 44. The motion of the carriage 48 (Y-axis) is generated through a rolling ball spindle 49 by a controllable electrical drive motor 50, which is driven through the connection 71. Connected with the drive motor 50 is a rotationally incremental rotation transmitter 51, which through a connection 65 delivers pulses, the number of which is a measure of the angle of rotation traversed by the drive motor 50.

By an appropriate control of the drive motors 46 and 50, the cam body 31 is moved, relative to the tool centre point defined by the central axis 38 of the tool spindle 29, along a portion of circular arc 35, which is defined by the circle centre point 36 in a plane fixedly connected with the not shown bearing of the tool spindle 29 and disposed perpendicularly to the central axis 38 of the tool spindle 29, by the radius 37, by the angle 34 and by the position of the end point 110.

In the case of a cam arrangement provided with an oscillating lever follower to be realized by the cam body 31, the centre point of the roller carried on the end of the lever follower — while the roller passes down on the cam flank of the cam body 31 defined by the angle 33 — is guided on a circular arc, which is to be identical with the circular arc 35 in respect of the magnitudes defining the circular arc and in respect of the relative position to the rotational axis of the cam body 31.

For the case in which the diameter of the roller follower is the same as that of the tool 30 and in which the centre point of the tool is guided on the circular arc portion 35 in the production of the cam flank bounded by the angle 33, while the cam body is simultaneously rotated about the workpiece spindle axis 39 by the amount of the angle 33, the centre point of the roller follower of the finished gearing — during the traverse of the cam flank characterised by the angle 33 — will move on the circular arc portion 35 in dependence upon angle of rotation of the cam body according to the same mathematical interrelationship as was applied during the motion of the centre point of the tool on the circular arc portion 35 in dependence upon the respective partial angle of the flank angle 33.

The three drive motors 42, 46 and 50 are controlled as follows:

A command signal for controlling the rotational speed of the drive motor 42 and hence for controlling the rotational speed of the workpiece spindle around the rotational axis 39, is fed in digital form to the digital-analog translator 52 through the connection 106. This control command is translated by the digital-analog translator 52 into an analog voltage, which serves as guiding magnitude to the regulator 54. The regulator 54 feeds the drive motor 42 through the connection 56. The rotational incremental rotation transmitter 43 connected with the drive motor 42 through the connection 55 delivers pulses, the number of which is a measure of the distance traversed by the drive motor 42, while the pulse frequency is a measure of the rotational speed of the drive motor. The connection 55 inter alia leads to the regulator 54, which hereby receives information about the actual rotational speed of the drive motor 42.

The paths to be transversed by the carriage 44 (X-axis) and 48 (Y-axis) in dependence upon the angle of rotation $\phi$ of the workpiece spindle with the central axis 39 are determined by a circle interpolator 100, which serves as control signal distributor. The circle interpolator 100 delivers the intended value for the magnitude of the X-path through the connection 57 and the intended value for the magnitude of the Y-path through the connection 63. The following processing of the data of the intended value of the X-path and Y-path occurs in the same manner for the X and Y axes. Merely the further processing of the intended value of the X-path is therefore described below. The control parts necessary of the processing of the intended Y value are identical with the control elements provided for the processing of the intended X value and the reference symbols allocated to the Y-axis are mentioned in brackets at appropriate places.

The information about the intended value of the X-path is fed through the connection 57 (63) to the position regulator 58 (64). The rotational incremental rotation transmitter 47 (51) through the connection 59 (65) delivers data, in the form of a pulse sequence, about the angle of rotation traversed by the drive motor 46 (50) and about the rotational speed. The data, transmitted through the connection 59 (65) to the position regulator 58 (64), of the angle of rotation traversed by the drive motor or the path traversed by the carriage 44 (48) are processed together by the position regulator 58 (64) with the data given in through connection 57 (63) for the intended path value and lead to information for the intended speed X (Y), which is fed through the connection 60 (66) to the consecutive speed regulator 61 (70). Together with the data about the actual speed of the drive motor 46 (50) fed to the speed regulator through the connection 59 (65), the speed regulator 61 (70) generates therefrom the control voltage, which is applied to the drive motor 46 (50) through the connection 62 (71).

Through the input means for data input 72, 73, 74, 75 and 76, the data for the characterisation of the camming surfaces to be provided on each flank are input to the storage 77 in the sequence of the envisaged processing, the data for the flank angle of each flank (angle 33) into the storage 78 in the sequence of the envisaged processing, the data of the swivel angles (according to angle 34) of the lever follower of the cam gear associated with each flank into the storage 79 in the sequence of the envisaged processing, the data about the length of the lever arm (according to radius 37) into the storage 80 and the data about the relative position of the centre point of the roller follower in the outer end position (according to point 110) associated with the flank, with the production of which shall be commenced, and about the relative position of the centre of rotation of the lever follower referred to the centre of rotation of the cam body, into the storage 81.

While the storage 80 and the storage 81 need be filled only once for each cam body (with one cam path), the storage 77, 78 and 79 contain data for several flanks. In order to be able to feed the data associated with the respective flanks at the correct instant to the control blocks further processing these data, read-out units 84, 85 and 86 with connections 87, 89 and 91 to the storages are provided. By a pulse, which reaches the read-out units through the connection 83, the read-out units are caused with the storages 77, 78 and 79 to switch over to another storage region and to put the new data at the disposal of the further processing control blocks through the connections 88, 90 and 92.

The switch-over pulse conducted through the connection 83 is generated by a programmable counter 82, which through the connection 55 receives all pulses generated by the rotational incremental rotation transmitter 43.

The value for the flank angle stored in the storage 78 represent any desired multiple of 0.1 degrees. It is attained by the choice of an appropriate translation ratio of the not shown gearing for the changing of the speed generated by the drive motor 42 and by an appropriate design of the rotational incremental rotation transmitter 43 that a pulse delivered by the rotation transmitter 43 corresponds to an angle of rotation of 0.00001 degrees of the round table 40 around the central axis 39 of the workpiece spindle.

The programmable counter 82 provides an output pulse through the connection 83 on the attainment of a predetermined counter position. To be able to signal the end of a flank angle stored in storage 78, the value of the flank angle at the start of the working down of the corresponding flank must be multiplied by the factor $10^4$ and the counter 82 programmed therewith. When a flank angle for example amounts to 72.6°, then the programmable counter must be programmed with the number 726,000. The recording of the respective new value into the programmable counter 82 occurs on initiation of the output pulses of this programmable counter through the read-out unit 85 and the cnnection 90.

Data for several cam laws in the form of normalized values of 0 to 1 for each time 1000 support points, spaced equally far from one another, of a cam law are stored in storage 96.

To be able to come from this in dependence upon the flank angle coming into question to a change of a displacement magnitude, for example change of the swivel angle 34, having a course according to the desired law, it is at first necessary to subdivide the flank angle coming into question into 1000 parts or to generate 1000 signals (for example pulses) during the rotation of the workpiece spindle by the amount of the flank angle. Then, a multiplication of the support point values must be undertaken with the displacement amount, desired for the corresponding flank, of the displacement magnitude. Example: the normalized value for the support point 800 amounts to 0.85 and the swivel angle 34 associated with the corresponding flank amounts to 20°. Then, a swivel angle of 17° must have been traversed on the attainment of the support point 800.

The 1000 impulses per flank angle necessary for the recall of the 1000 support points are derived from the pulses of the rotation transmitter 43, which are fed to the programmable counter 93 through the connection 55. The programmable counter 93 then delivers an output pulse through the connection 94 each time when the state of count is identical with the programmed number. After delivery of the output pulse, the contents of the counter are deleted and the counting beings anew.

The value for the flank angle (as multiple of 0.1°) deposited in storage 78 serves for the programming of the programmable counter. This value is read out of the storage 78 by the read-out unit 85 and after multiplication by the factor 10 put through the connection 90 into the programmable counter 93. A change of the value to be programmed takes place on each transition to a new flank.

Example: The flank angle amounts to 122.3°. The value 1223 gets into the programmable storage so that an output pulse is generated, which signals the attainment of a new support point, after each 1223rd pulse, which is given in through the connection 55. The 1000th output pulse is generated after the input of the 1,223,000th input pulse. Since one input pulse corresponds to 0.001°, exactly 122.3° have been traversed by the workpiece spindle after the 1000th output pulse.

The reading out of the support values of the cam law occurs by the reading unit 111 through the connection 95. The output pulses of the programmable counter 93, which initiate the read-out of a new support point value, get through the connection 94 to the reading unit 111. Through the connection 88, it is indicated which law is to get to read-out. The values read out by the reading unit 111 are fed through a connection 97 to a multiplier 98, which multiplies them with the value of the respective swivel angle from storage 79 put at disposal through the connection 92 and passes them on to the circle interpolator 100 connection 99. The values passed on through connection 99 represent the intended values of the swivel angle 34, which according to the chosen cam law must be traversed by the tool centre point with respect to the centre point 36. Since the swivel angle 34 to be traversed must however be generated by the displacement of two linearly displaceable carriages 44 and 48, the statements of angle are recalculated by the circle interpolator 100 into corresponding X and Y paths for the carriages 44 and 48.

For this, the circle interpolator still requires data about the length of the lever arm (according to the radius 37) and about the relative position of the centre point of the driven roller in the outer position (according to point 110) associated with that flank, with the production of which shall be commenced, and about the relative position of the centre of rotation of the driven lever referred to the centre of rotation of the cam body. These data are obtained from the storages 80 and 81 through the connections 101 and 102.

The two control blocks, programmable counter 93 and multiplier 98, undertake the interlinking of the workpiece-dependent data for flank angle 33 and swivel angle 34 and the workpiece-independent data of the cam laws. By corresponding characterisation in FIG. 3, they are collectively designated as interlinking device 112 for workpiece-dependent and workpiece-independent data.

The respective perpendicular spacing from the central axis of the workpiece spindle to the central axis of the tool spindle can be calculated by the calculator unit 103 from the values, which the circle interpolator 100 puts at disposal through the connection 57 and 63 and from the data, which are desposited in storage 81, and be passed on through the connection 104 to the calculator unit 105.

According to information about the speed of rotation respectively predetermined for the drive motors 46 and 50, which is obtained through the connections 60 and 66, the calculator unit 105 is in a position to calculate that speed of rotation of the drive motor 42 by which a maintaining constant of the path speed of the centre point of the tool can be attained, and to pass it on through the connection 106 to the digital-analog translator 52. By path speed is understood in that case that component of speed of the centre point of the tool, which runs parallel to the tangent to the cam path in that point, in which the connecting line from the centre point of the tool to the centre point of the cam body cuts the cam path.

The intended value for the path speed is recorded in the storage 108 and fed to the calculator unit 105 through the connection 107.

The appropriate commands may be input to the control system through the start-stop input 109 and the connection 113. The calculator unit 105 is moreover in a position on the occurence of the start-command or the stop-command to raise the path speed with a steady transition from zero to the desired intended value or to lower it from the desired intended value with a steady transition to zero.

I claim:

1. An automatic milling or grinding machine comprising in combination:
   a frame;
   tool support means supported on said frame;
   workpiece support means mounted on said frame to be rotationally and rectilinearly displaceable relative thereto;
   rotational drive means to rotate said workpiece support means;
   first drive means to rectilinearly displace said workpiece support means in a first co-ordinate direction in a plane perpendicular to the axis of rotation of said workpiece support means;
   second drive means to rectilinearly displace said workpiece support means in a second co-ordinate direction in said plane and perpendicular to said first co-ordinate direction;
   first storage means to store information relating to a law of a camming surface to be formed on said workpiece by said machine;
   second storage means to store information relating to workpiece-dependent parameters for determining dimensional characteristics of given portions of said camming surface;
   co-ordinator means to operatively associate with one another related items of information derived from each of said first and second storage means thereby to generate a succession of angle information signals, said succession defining a circular arc corresponding to one on which the axis of rotation of a roller follower of given dimensions would move on following said camming surface; and
   command signal generator means connected to said co-ordinator means and responsive to said angle information signals to apply respective command signals to each of said first and second rectilinear drive means thereby to cause said workpiece to be displaced relative to said tool along said circular arc.

2. A machine as defined in claim 1, comprising a pulse generator for generating timing pulses to control the read-out of information from said first and second storage means and to control the application of respective command signals to each of said drive means.

3. A machine as defined in claim 2, wherein said pulse generator is driven synchronously by said first drive means.

4. A machine as defined in claim 2, wherein said pulse generator is driven synchronously by said rotational drive means.

5. A machine as defined in claim 1, comprising control means to maintain at a substantially constant value the speed of displacement of said workpiece support means relative to said tool support means in a direction tangential of said camming surface.

6. A machine as defined in claim 1, comprising an accessory device to modify said command signals in accordance with any difference between a prescribed value of tool diameter and the actual diameter of a particular milling or grinding tool to be mounted on said tool support means.

7. A machine as defined in claim 1, wherein said co-ordinator means and said command signal generator means each comprise a plurality of storage locations in a digital computer, said storage locations being differently inter-connected for the execution of each individual control step in a succession of control steps.

* * * * *